(12) United States Patent
Singh

(10) Patent No.: US 11,694,817 B2
(45) Date of Patent: Jul. 4, 2023

(54) SYSTEM AND METHOD OF STORING AND/OR TRANSFERRING HIGH LEVEL RADIOACTIVE WASTE

(71) Applicant: Holtec International, Camden, NJ (US)

(72) Inventor: Krishna P. Singh, Hobe Sound, FL (US)

(73) Assignee: Holtec International

( * ) Notice: Subject to any disclaimer, the term of this patent is extended or adjusted under 35 U.S.C. 154(b) by 219 days.

(21) Appl. No.: 17/135,930

(22) Filed: Dec. 28, 2020

(65) Prior Publication Data

US 2021/0225539 A1 Jul. 22, 2021

Related U.S. Application Data

(63) Continuation of application No. 15/798,705, filed on Oct. 31, 2017, now Pat. No. 10,892,063, which is a
(Continued)

(51) Int. Cl.
*G21F 5/005* (2006.01)
*G21F 9/34* (2006.01)
(Continued)

(52) U.S. Cl.
CPC .............. *G21F 5/005* (2013.01); *G21C 19/40* (2013.01); *G21F 5/10* (2013.01); *G21F 5/12* (2013.01); *G21F 9/34* (2013.01)

(58) Field of Classification Search
CPC ......... G21C 19/40; G21F 5/005; G21F 5/008; G21F 5/10; G21F 5/12; G21F 9/34
See application file for complete search history.

(56) References Cited

U.S. PATENT DOCUMENTS 1,978,610 A 10/1934 Straty
2,040,370 A 5/1936 Fisher
(Continued)

FOREIGN PATENT DOCUMENTS

CN 1345452 4/2002
DE 2821780 11/1979
(Continued)

OTHER PUBLICATIONS

International Atomic Energy Agency, "Multi-purpose container technologies for spent fuel management," Dec. 2000 (IAEA-TECDOC-1192) pp. 1-49.
(Continued)

*Primary Examiner* — Sharon M Davis
(74) *Attorney, Agent, or Firm* — The Belles Group, P.C.

(57) ABSTRACT

A module for storing high level radioactive waste includes an outer shell, having a hermetically closed bottom end, and an inner shell forming a cavity and being positioned inside the outer shell to form a space therebetween. At least one divider extends from the top to the bottom of the inner shell to create a plurality of inlet passageways through the space, each inlet passageway connecting to a bottom portion of the cavity. A plurality of inlet ducts each connect at least one of the inlet passageways and ambient atmosphere, and each includes an inlet duct cover affixed atop a surrounding inlet wall, the inlet wall being peripherally perforated. A removable lid is positioned atop the inner shell and has at least one outlet passageway connecting the cavity and the ambient atmosphere, the lid and the top of the inner shell being configured to form a hermetic seal therebetween.

20 Claims, 9 Drawing Sheets

Related U.S. Application Data continuation of application No. 14/395,790, filed as application No. PCT/US2013/037228 on Apr. 18, 2013, now Pat. No. 9,831,005.

(60) Provisional application No. 61/625,869, filed on Apr. 18, 2012.

(51) Int. Cl.
  *G21C 19/40* (2006.01)
  *G21F 5/10* (2006.01)
  *G21F 5/12* (2006.01)

(56) References Cited

U.S. PATENT DOCUMENTS

| | | |
|---|---|---|
| 2,173,759 A | 9/1939 | McCloskey |
| 2,412,169 A | 12/1946 | O'Neil |
| 2,432,929 A | 12/1947 | Parrish |
| 2,486,199 A | 10/1949 | Nier |
| 2,630,936 A | 3/1953 | Freygang |
| 3,101,532 A | 8/1963 | Christensen |
| 3,111,078 A | 11/1963 | Breckenridge |
| 3,111,586 A | 11/1963 | Rogers |
| 3,414,727 A | 12/1968 | Bonilla |
| 3,487,756 A | 1/1970 | Glaza et al. |
| 3,629,062 A | 12/1971 | Muenchow |
| 3,739,451 A | 6/1973 | Jacobson |
| 3,745,707 A | 7/1973 | Herr |
| 3,755,079 A | 8/1973 | Soodak et al. |
| 3,765,549 A | 10/1973 | Jones |
| 3,800,973 A | 4/1974 | Weaver |
| 3,836,267 A | 9/1974 | Schatz |
| 3,845,315 A | 10/1974 | Blum |
| 3,910,006 A | 10/1975 | James |
| 3,917,953 A | 11/1975 | Wodrich |
| 3,935,062 A | 1/1976 | Keller et al. |
| 3,945,509 A | 3/1976 | Weems |
| 3,962,587 A | 6/1976 | Dufrane et al. |
| 3,963,052 A | 6/1976 | Mercier |
| 3,984,942 A | 10/1976 | Schroth |
| 4,055,508 A | 10/1977 | Yoli et al. |
| 4,078,968 A | 3/1978 | Golden et al. |
| 4,158,599 A | 6/1979 | Andrews et al. |
| 4,192,350 A | 3/1980 | Mercier |
| 4,278,892 A | 7/1981 | Baatz et al. |
| 4,288,698 A | 9/1981 | Baatz et al. |
| 4,289,987 A | 9/1981 | Russell et al. |
| 4,336,460 A | 6/1982 | Best et al. |
| 4,355,000 A | 10/1982 | Lumelleau |
| 4,356,146 A | 10/1982 | Knappe et al. |
| 4,366,095 A | 12/1982 | Takats et al. |
| 4,377,509 A | 3/1983 | Haynes et al. |
| 4,388,273 A | 6/1983 | Graf, Jr. et al. |
| 4,394,022 A | 7/1983 | Gilmore |
| 4,423,802 A | 1/1984 | Botzem et al. |
| 4,450,134 A | 5/1984 | Soot et al. |
| 4,498,011 A | 2/1985 | Dyck et al. |
| 4,525,324 A | 6/1985 | Spilker et al. |
| 4,526,344 A | 7/1985 | Oswald et al. |
| 4,527,066 A | 7/1985 | Dyck et al. |
| 4,527,067 A | 7/1985 | Dyck et al. |
| 4,532,104 A | 7/1985 | Wearden et al. |
| 4,532,428 A | 7/1985 | Dyck et al. |
| 4,582,638 A | 4/1986 | Homer et al. |
| 4,585,611 A | 4/1986 | Perl |
| 4,596,688 A | 6/1986 | Popp |
| 4,623,510 A | 11/1986 | Troy |
| 4,634,875 A | 1/1987 | Kugeler et al. |
| 4,635,477 A | 1/1987 | Simon |
| 4,649,018 A | 3/1987 | Waltersdorf et al. |
| 4,663,533 A | 5/1987 | Kok et al. |
| 4,666,659 A | 5/1987 | Lusk et al. |
| 4,671,326 A | 6/1987 | Wilhelm et al. |
| 4,683,533 A | 7/1987 | Shiozaki et al. |
| 4,690,795 A | 9/1987 | Hardin et al. |
| 4,730,663 A | 3/1988 | Voelkl et al. |
| 4,764,333 A | 8/1988 | Minshall et al. |
| 4,765,525 A | 8/1988 | Popp et al. |
| 4,780,269 A | 10/1988 | Fischer et al. |
| 4,800,062 A | 1/1989 | Craig et al. |
| 4,834,916 A | 5/1989 | Chaudon et al. |
| 4,847,009 A | 7/1989 | Madle et al. |
| 4,851,183 A | 7/1989 | Hampel |
| 4,893,022 A | 1/1990 | Hall et al. |
| 4,971,752 A | 11/1990 | Parker |
| 5,018,772 A | 5/1991 | Obermeyer et al. |
| 5,102,615 A | 4/1992 | Grande et al. |
| 5,161,413 A | 11/1992 | Junker et al. |
| 5,182,076 A | 1/1993 | De Seroux et al. |
| 5,205,966 A | 4/1993 | Elmaleh |
| 5,267,280 A | 11/1993 | Duquesne |
| 5,297,917 A | 3/1994 | Freneix |
| 5,307,388 A | 4/1994 | Inkester et al. |
| 5,319,686 A | 6/1994 | Pizzano et al. |
| 5,387,741 A | 2/1995 | Shuttle |
| 5,442,186 A | 8/1995 | Walker et al. |
| 5,469,936 A | 11/1995 | Lauga et al. |
| 5,475,721 A | 12/1995 | Baatz et al. |
| 5,513,231 A | 4/1996 | Jones et al. |
| 5,513,232 A | 4/1996 | Jones et al. |
| 5,546,436 A | 8/1996 | Jones et al. |
| 5,564,498 A | 10/1996 | Bochard |
| 5,633,904 A | 5/1997 | Gilligan, III et al. |
| 5,646,971 A | 7/1997 | Howie |
| 5,661,768 A | 8/1997 | Gilligan, III et al. |
| 5,685,449 A | 11/1997 | Oblak |
| 5,753,925 A | 5/1998 | Yamanaka et al. |
| 5,771,265 A | 6/1998 | Montazer |
| 5,852,643 A | 12/1998 | Copson |
| 5,862,195 A | 1/1999 | Peterson |
| 5,898,747 A | 4/1999 | Singh |
| 5,926,602 A | 7/1999 | Okura |
| 6,064,710 A | 5/2000 | Singh |
| 6,064,711 A | 5/2000 | Copson |
| 6,074,771 A | 6/2000 | Cubukcu et al. |
| 6,114,710 A | 9/2000 | Contrepois et al. |
| 6,252,923 B1 | 6/2001 | Iacovino et al. |
| 6,452,994 B2 | 9/2002 | Pennington |
| 6,489,623 B1 | 12/2002 | Peters et al. |
| 6,519,307 B1 | 2/2003 | Singh et al. |
| 6,519,308 B1 | 2/2003 | Boardman |
| 6,587,536 B1 | 7/2003 | Singh et al. |
| 6,625,246 B1 | 9/2003 | Singh et al. |
| 6,718,000 B2 | 4/2004 | Singh et al. |
| 6,793,450 B2 | 9/2004 | Singh et al. |
| 6,853,697 B2 | 2/2005 | Singh et al. |
| 7,068,748 B2 | 6/2006 | Singh |
| 7,194,060 B2 | 3/2007 | Ohsono et al. |
| 7,294,375 B2 | 11/2007 | Taniuchi et al. |
| 7,330,525 B2 | 2/2008 | Singh et al. |
| 7,330,526 B2 | 2/2008 | Singh |
| 7,590,213 B1 | 9/2009 | Singh |
| 7,628,287 B1 | 12/2009 | Arnold |
| 7,933,374 B2 | 4/2011 | Singh |
| 7,994,380 B2 | 8/2011 | Singh et al. |
| 8,042,598 B2 | 10/2011 | Bredemus et al. |
| 8,067,659 B2 | 11/2011 | Singh et al. |
| 8,351,562 B2 | 1/2013 | Singh |
| 8,798,224 B2 | 8/2014 | Singh |
| 2003/0004390 A1 | 1/2003 | Matsunaga et al. |
| 2003/0144568 A1 | 7/2003 | Singh et al. |
| 2003/0147486 A1 | 8/2003 | Singh et al. |
| 2003/0147730 A1 | 8/2003 | Singh et al. |
| 2003/0194042 A1 | 10/2003 | Singh et al. |
| 2004/0020919 A1 | 2/2004 | Hirano et al. |
| 2004/0071254 A1 | 4/2004 | Malalel |
| 2004/0109523 A1 | 6/2004 | Singh et al. |
| 2004/0175259 A1 | 9/2004 | Singh et al. |
| 2005/0008462 A1 | 1/2005 | Singh et al. |
| 2005/0066541 A1 | 3/2005 | Singh et al. |
| 2005/0173432 A1 | 8/2005 | Chanzy |
| 2005/0207525 A1 | 9/2005 | Singh |
| 2005/0207535 A1 | 9/2005 | Alving et al. |

(56) References Cited

U.S. PATENT DOCUMENTS

| | | |
|---|---|---|
| 2005/0220256 A1 | 10/2005 | Singh |
| 2005/0220257 A1* | 10/2005 | Singh .................. G21F 5/12 |
| | | 376/272 |
| 2005/0224729 A1 | 10/2005 | Tamaki |
| 2006/0215803 A1* | 9/2006 | Singh .................. G21F 5/002 |
| | | 376/272 |
| 2006/0251201 A1 | 11/2006 | Singh |
| 2006/0272175 A1 | 12/2006 | Singh |
| 2006/0288607 A1 | 12/2006 | Singh |
| 2007/0003000 A1 | 1/2007 | Singh et al. |
| 2008/0017644 A1 | 1/2008 | Wickland et al. |
| 2008/0031396 A1 | 2/2008 | Singh et al. |
| 2008/0031397 A1 | 2/2008 | Singh et al. |
| 2008/0056935 A1 | 3/2008 | Singh |
| 2008/0069291 A1 | 3/2008 | Singh et al. |
| 2008/0076953 A1 | 3/2008 | Singh et al. |
| 2008/0084958 A1 | 4/2008 | Singh et al. |
| 2008/0086025 A1 | 4/2008 | Van Der Lee et al. |
| 2008/0095295 A1 | 4/2008 | Fuls |
| 2008/0210891 A1 | 9/2008 | Wagner et al. |
| 2008/0260088 A1 | 10/2008 | Singh et al. |
| 2008/0265182 A1 | 10/2008 | Singh et al. |
| 2008/0314570 A1 | 12/2008 | Singh et al. |
| 2009/0069621 A1 | 3/2009 | Singh et al. |
| 2009/0158614 A1 | 6/2009 | Singh et al. |
| 2009/0159550 A1 | 6/2009 | Singh et al. |
| 2009/0175404 A1 | 7/2009 | Singh et al. |
| 2009/0198092 A1 | 8/2009 | Singh et al. |
| 2009/0252274 A1 | 10/2009 | Singh |
| 2010/0032591 A1 | 2/2010 | Lemer |
| 2010/0150297 A1 | 6/2010 | Singh |
| 2010/0212182 A1 | 8/2010 | Singh |
| 2010/0232563 A1 | 9/2010 | Singh et al. |
| 2010/0272225 A1 | 10/2010 | Singh |
| 2010/0282448 A1 | 11/2010 | Singh et al. |
| 2010/0282451 A1 | 11/2010 | Singh et al. |
| 2010/0284506 A1 | 11/2010 | Singh |
| 2011/0021859 A1 | 1/2011 | Singh |
| 2011/0033019 A1 | 2/2011 | Rosenbaum et al. |
| 2011/0049155 A1 | 3/2011 | Levine et al. |
| 2011/0150164 A1 | 6/2011 | Singh et al. |
| 2011/0172484 A1 | 7/2011 | Singh et al. |
| 2011/0239683 A1 | 10/2011 | Czamara et al. |
| 2011/0255647 A1 | 10/2011 | Singh |
| 2011/0286567 A1 | 11/2011 | Singh et al. |
| 2012/0083644 A1 | 4/2012 | Singh et al. |
| 2012/0142991 A1 | 6/2012 | Singh et al. |
| 2012/0226088 A1 | 9/2012 | Singh et al. |
| 2012/0267377 A1 | 10/2012 | Mueller et al. |
| 2012/0294737 A1 | 11/2012 | Singh et al. |
| 2012/0306172 A1 | 12/2012 | Singh |
| 2012/0307956 A1 | 12/2012 | Singh et al. |
| 2013/0068578 A1 | 3/2013 | Saito et al. |
| 2013/0070885 A1 | 3/2013 | Singh et al. |
| 2013/0163710 A1 | 6/2013 | Singh |
| 2014/0047733 A1 | 2/2014 | Singh et al. |
| 2014/0105347 A1 | 4/2014 | Singh et al. |
| 2014/0192946 A1 | 7/2014 | Singh |
| 2014/0341330 A1 | 11/2014 | Singh |

FOREIGN PATENT DOCUMENTS

| | | |
|---|---|---|
| DE | 3107158 | 1/1983 |
| DE | 3144113 | 5/1983 |
| DE | 3151475 | 5/1983 |
| DE | 3404666 | 8/1985 |
| DE | 3515871 | 11/1986 |
| DE | 19529357 | 2/1997 |
| EP | 0253730 | 1/1988 |
| EP | 1061011 | 12/2000 |
| EP | 1312874 | 5/2003 |
| EP | 2853813 | 4/2015 |
| FR | 2434463 | 3/1980 |
| GB | 2295484 | 5/1996 |
| GB | 2327722 | 2/1999 |
| GB | 2337722 | 12/1999 |
| JP | 59193000 | 11/1984 |
| JP | 62185199 | 8/1987 |
| JP | 10297678 | 11/1998 |
| JP | 2001056392 | 2/2001 |
| JP | 2001141891 | 5/2001 |
| JP | 2001264483 | 9/2001 |
| JP | 2003207597 | 7/2003 |
| JP | 2003240894 | 8/2003 |
| JP | 2004233055 | 8/2004 |
| KR | 100833207 | 5/2008 |
| RU | 2168022 | 5/2001 |

OTHER PUBLICATIONS

U.S. Department of Energy, "Conceptual Design for a Waste-Management System that Uses Multipurpose Canisters," Jan. 1994 pp. 1-14.

Federal Register Environmental Documents, "Implementation Plan for the Environmental Impact Statement for a Multi-Purpose Canister System for Management of Civialian and Naval Spent Nuclear Fuel," Aug. 30, 1995 (vol. 60, No. 168) pp. 1-7.

National Conference of State Legislatures, "Developing a Multi-purpose Canister System for Spent Nuclear Fuel," State Legislative Report, col. 19, No. 4 by Sia Davis et al., Mar. 1, 1994, pp. 1-4.

Energy Storm Article, "Multi-purpose canister system evaluation: A systems engineering approach," Author unavailable, Sep. 1, 1994, pp. 1-2.

Science, Society, and America's Nuclear Waste-Teacher Guide, "The Role of the Multi-Purpose Canister in the Waste Management System," Author—unknown, Date—unknown, 5 pgs.

USEC Inc. Article, "NAC International: A Leader in Used Fuel Storage Technologies," copyright 2008, 2 pages.

Federal Register Notice, Nept. of Energy, "Record of Decision for a Multi-Purpose Canister or Comparable System," vol. 64, No. 85, May 4, 1999.

Zorpette, Glenn: "CAnnet Heat", Nuclear Power, Special Report, in IEEE Spectrum, Nov. 2001, pp. 44-47.

Optimization Strategies for Cask Design and Container Loading in Long Term Spent Fuel Storage, Dec. 2006 (Dec. 2006) [retrieved on Jan. 23, 2013 (Jan. 23, 2013)]. Retrieved from the Internet:<URL: http://www-pub.iaea.org/MTCD/publications/PDF/te_1523_web.pdf (US).

International Search Report and Written Opinion of the International Searching Authority for PCT/US2012/62470, dated Feb. 21, 2013.

\* cited by examiner

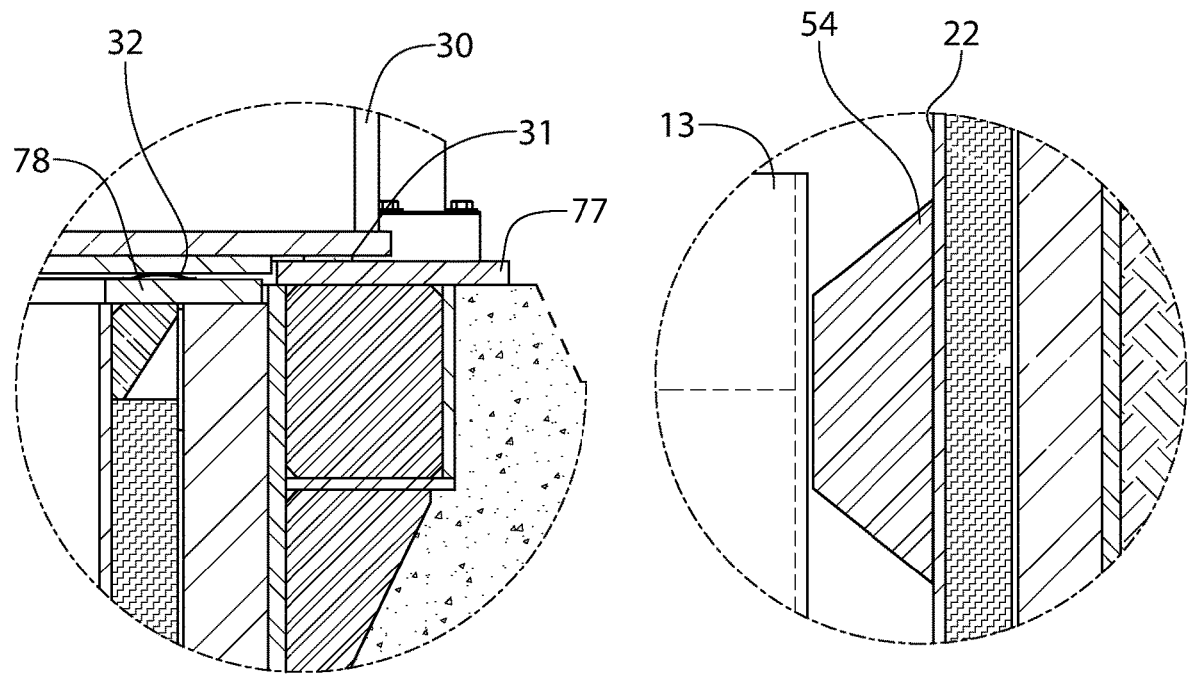
FIG. 5D
FIG. 5C
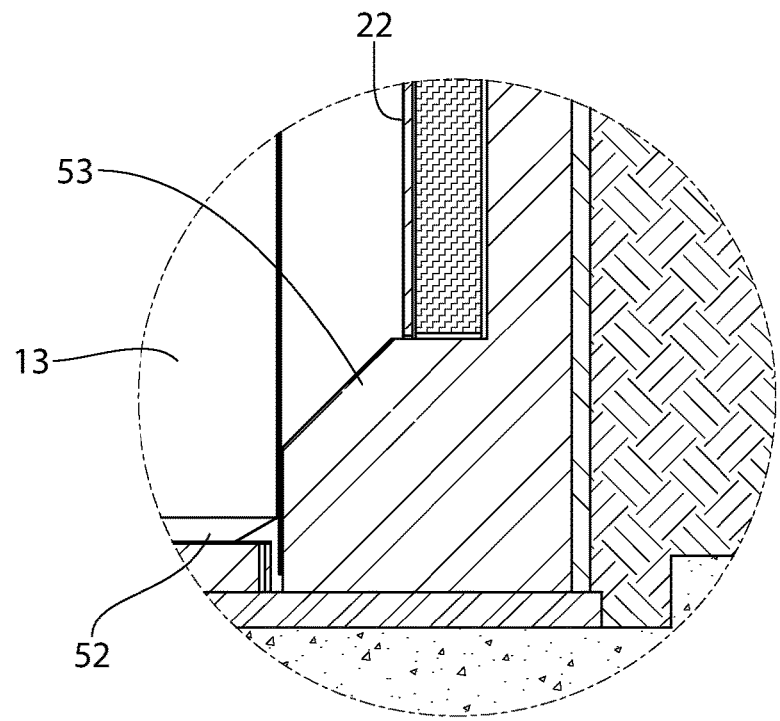
FIG. 5B

SYSTEM AND METHOD OF STORING AND/OR TRANSFERRING HIGH LEVEL RADIOACTIVE WASTE

CROSS REFERENCE TO RELATED APPLICATIONS

The present application is a continuation of U.S. patent application Ser. No. 15/798,705 filed Oct. 31, 2017, which is continuation of U.S. patent application Ser. No. 14/395,790 filed Oct. 20, 2014, which is a U.S. national stage application under 35 U.S.C. § 371 of PCT Application No. PCT/US2013/037228, filed on Apr. 18, 2013, which claims the benefit of U.S. Provisional Patent Application 61/625,869, filed Apr. 18, 2012; the disclosures of which are incorporated herein by reference in their entireties.

FIELD OF THE INVENTION

The field of the present invention relates systems and methods for storing high level waste ("HLW"), such as spent nuclear fuel, in ventilated vertical modules.

BACKGROUND OF THE INVENTION

The storage, handling, and transfer of HLW, such as spent nuclear fuel, requires special care and procedural safeguards. For example, in the operation of nuclear reactors, it is customary to remove fuel assemblies after their energy has been depleted down to a predetermined level. Upon removal, this spent nuclear fuel is still highly radioactive and produces considerable heat, requiring that great care be taken in its packaging, transporting, and storing. In order to protect the environment from radiation exposure, spent nuclear fuel is first placed in a canister. The loaded canister is then transported and stored in large cylindrical containers called casks. A transfer cask is used to transport spent nuclear fuel from location to location while a storage cask is used to store spent nuclear fuel for a determined period of time.

In a typical nuclear power plant, an open empty canister is first placed in an open transfer cask. The transfer cask and empty canister are then submerged in a pool of water. Spent nuclear fuel is loaded into the canister while the canister and transfer cask remain submerged in the pool of water. Once fully loaded with spent nuclear fuel, a lid is typically placed atop the canister while in the pool. The transfer cask and canister are then removed from the pool of water, the lid of the canister is welded thereon and a lid is installed on the transfer cask. The canister is then properly dewatered and filled with inert gas. The transfer cask (which is holding the loaded canister) is then transported to a location where a storage cask is located. The loaded canister is then transferred from the transfer cask to the storage cask for long term storage. During transfer from the transfer cask to the storage cask, it is imperative that the loaded canister is not exposed to the environment.

One type of storage cask is a ventilated vertical overpack ("VVO"). A VVO is a massive structure made principally from steel and concrete and is used to store a canister loaded with spent nuclear fuel (or other HLW). VVOs stand above ground and are typically cylindrical in shape and extremely heavy, weighing over 150 tons and often having a height greater than 16 feet. VVOs typically have a flat bottom, a cylindrical body having a cavity to receive a canister of spent nuclear fuel, and a removable top lid.

In using a VVO to store spent nuclear fuel, a canister loaded with spent nuclear fuel is placed in the cavity of the cylindrical body of the VVO. Because the spent nuclear fuel is still producing a considerable amount of heat when it is placed in the VVO for storage, it is necessary that this heat energy is able to escape from the VVO cavity. This heat energy is removed from the outside surface of the canister by ventilating the VVO cavity. In ventilating the VVO cavity, cool air enters the VVO chamber through inlet ventilation ducts, flows upward past the loaded canister, and exits the VVO at an elevated temperature through outlet ventilation ducts.

While it is necessary that the VVO cavity be vented so that heat can escape from the canister, it is also imperative that the VVO provide adequate radiation shielding and that the spent nuclear fuel not be directly exposed to the external environment. U.S. Pat. No. 7,933,374, issued Apr. 26, 2011, the disclosure of which is incorporated herein by reference in its entirety, discloses a VVO which meets these shielding needs.

The effect of wind on the thermal performance of a ventilated system can also be a serious drawback that, to some extent, afflicts all systems in use in the industry at the present time. Storage VVO's with only two inlet or outlet ducts are especially vulnerable. While axisymmetric air inlet and outlet ducts behave extremely well in quiescent air, when the wind is blowing, the flow of air entering and leaving the system is skewed, frequently leading to a reduced heat rejection capacity.

SUMMARY OF THE INVENTION

A module for storing high level radioactive waste includes an outer shell having a hermetically closed bottom end and an inner shell disposed inside the outer shell so as to form a space between the inner shell and the outer shell. At least one divider extends from a top of the inner shell to a bottom of the inner shell, the at least one divider creating a plurality of inlet passageways through the space, each inlet passageway connecting to a bottom portion of the cavity. A plurality of inlet ducts each connect at least one of the inlet passageways to ambient atmosphere. The inlet ducts are configured such that when the module is inset into the ground, the air pressure about each inlet duct is substantially the same. A removable lid is positioned on the inner shell, and the lid having at least one outlet passageway connecting the cavity and the ambient atmosphere. The lid and the top of the inner shell are respectively configured to form a hermetic seal at a top of the cavity.

In a first separate aspect of the present invention, each inlet duct comprises an inlet duct cover affixed over a surrounding inlet wall, with the inlet wall being peripherally perforated. The inlet wall may be peripherally perforated to have a minimum of 60% open area.

In a second separate aspect of the present invention, the lid further includes an outlet duct connecting the at least one outlet passageway and the ambient atmosphere. The outlet duct includes an outlet duct cover affixed over a surrounding outlet wall, with the outlet wall being peripherally perforated. The outlet wall may be peripherally perforated to have a minimum of 60% open area.

In a third separate aspect of the present invention, a hermetically sealed canister for containing high-level waste is positioned within the cavity, wherein the cavity has a horizontal cross-section that accommodates no more than one canister.

In a fourth separate aspect of the present invention, the top of the upper shield extends to or above the inlet ducts.

In a fourth separate aspect of the present invention, at least four dividers extend from a top of the inner shell to a bottom of the inner shell, thereby forming a plurality of the inlet passageways, and each divider includes an extension portion extending into the cavity, the extension portion configured as a positioning flange for a canister disposed within the cavity.

In a fifth separate aspect of the present invention, each of the inlet ducts maintains an intake air pressure independently of each of the other inlet ducts.

In a sixth separate aspect of the present invention, each of the inlet ducts maintains an intake air pressure substantially the same as each of the other inlet ducts.

In a seventh separate aspect of the present invention, a system including a plurality of the modules is employed, with the inlet ducts of a first of the modules maintains air pressure independently of the inlet ducts of a second of the modules.

In an eighth separate aspect of the present invention, a method of storing high level waste includes providing a module having an outer shell having a hermetically closed bottom end and an inner shell disposed inside the outer shell so as to form a space between the inner shell and the outer shell. At least one divider extends from a top of the inner shell to a bottom of the inner shell, the at least one divider creating a plurality of inlet passageways through the space, each inlet passageway connecting to a bottom portion of the cavity. A plurality of inlet ducts each connect at least one of the inlet passageways to ambient atmosphere. The inlet ducts are configured such that when the module is inset into the ground, the air pressure at each inlet duct is substantially the same, and the air pressure at each inlet duct is independent of the air pressure at the other inlet ducts. A canister containing high level radioactive waste is placed into the cavity. A lid is positioned over the cavity, with the lid having at least one outlet passageway connecting the cavity and the ambient atmosphere. The lid and the top of the inner shell are respectively configured to form a hermetic seal at a top of the cavity.

In a ninth separate aspect of the present invention, one or more of the preceding separate aspects may be employed in combination.

Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIGS. 5B-5D are detailed views of the indicated parts of FIG. 5A.

DETAILED DESCRIPTION OF THE INVENTION

Figure 1A:
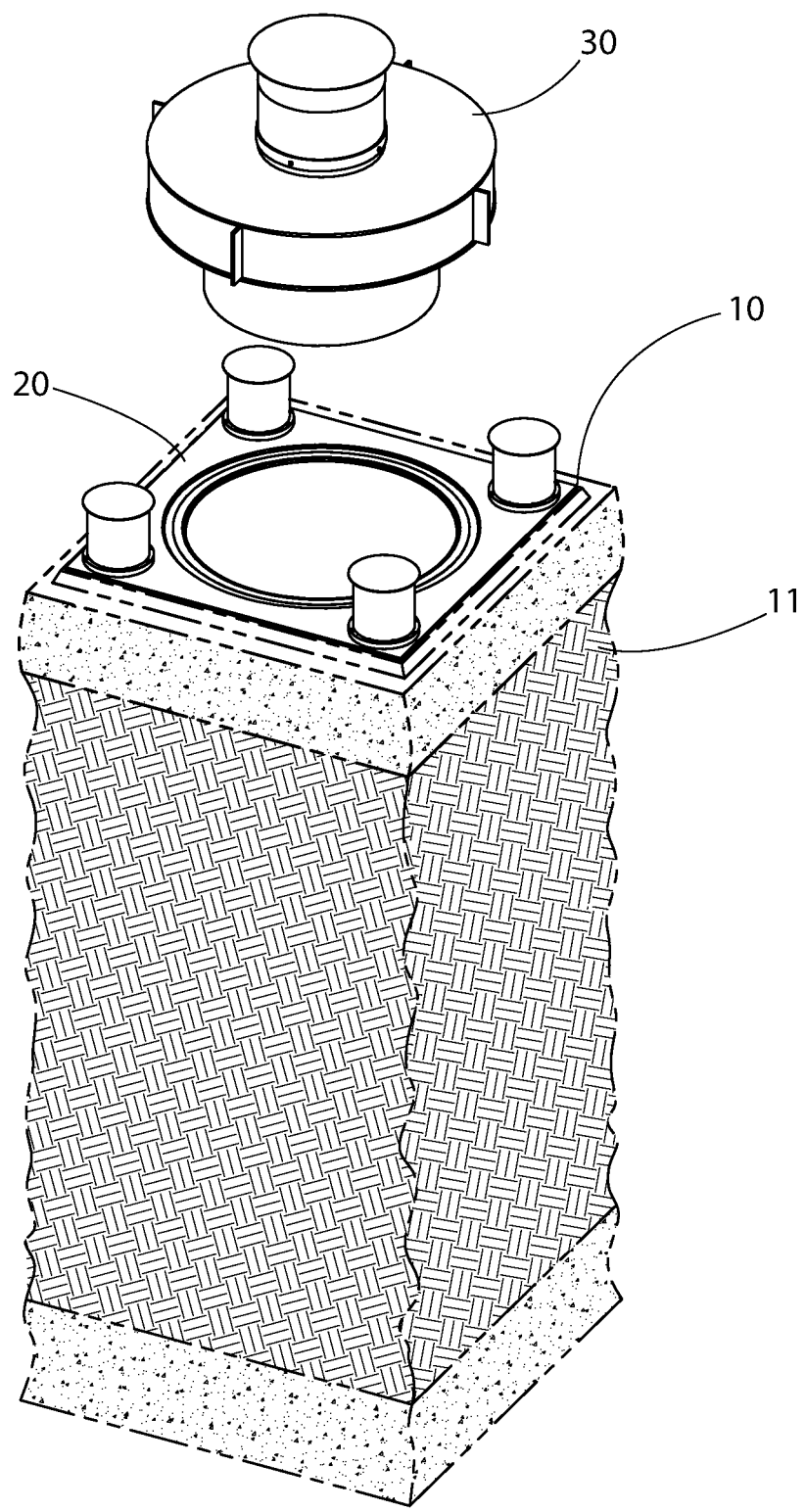
FIG. 1A is a partially exploded perspective view of a HLW storage container.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Figure 1B:
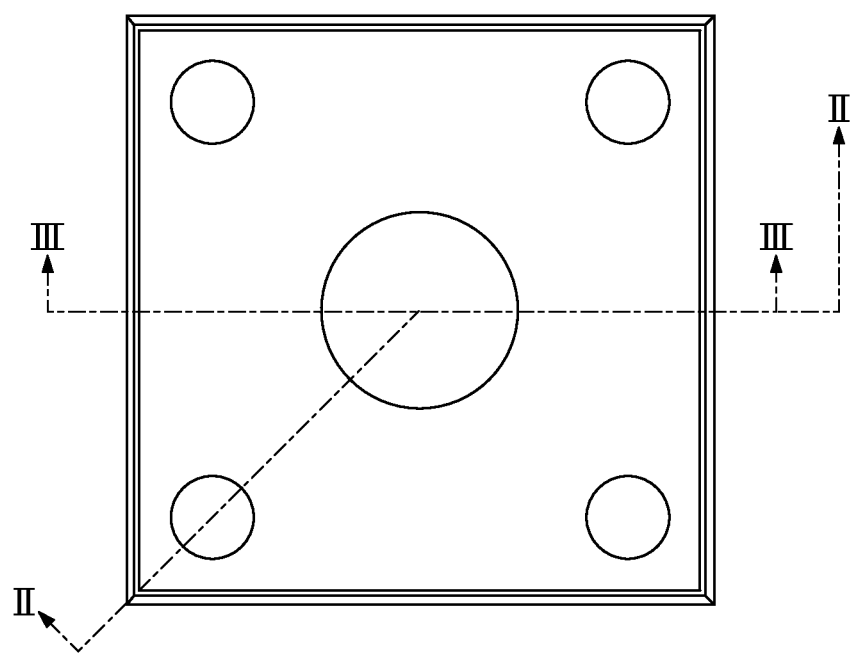
FIG. 1B is a top plan view of the HLW storage container of FIG. 1.
Figure 2:
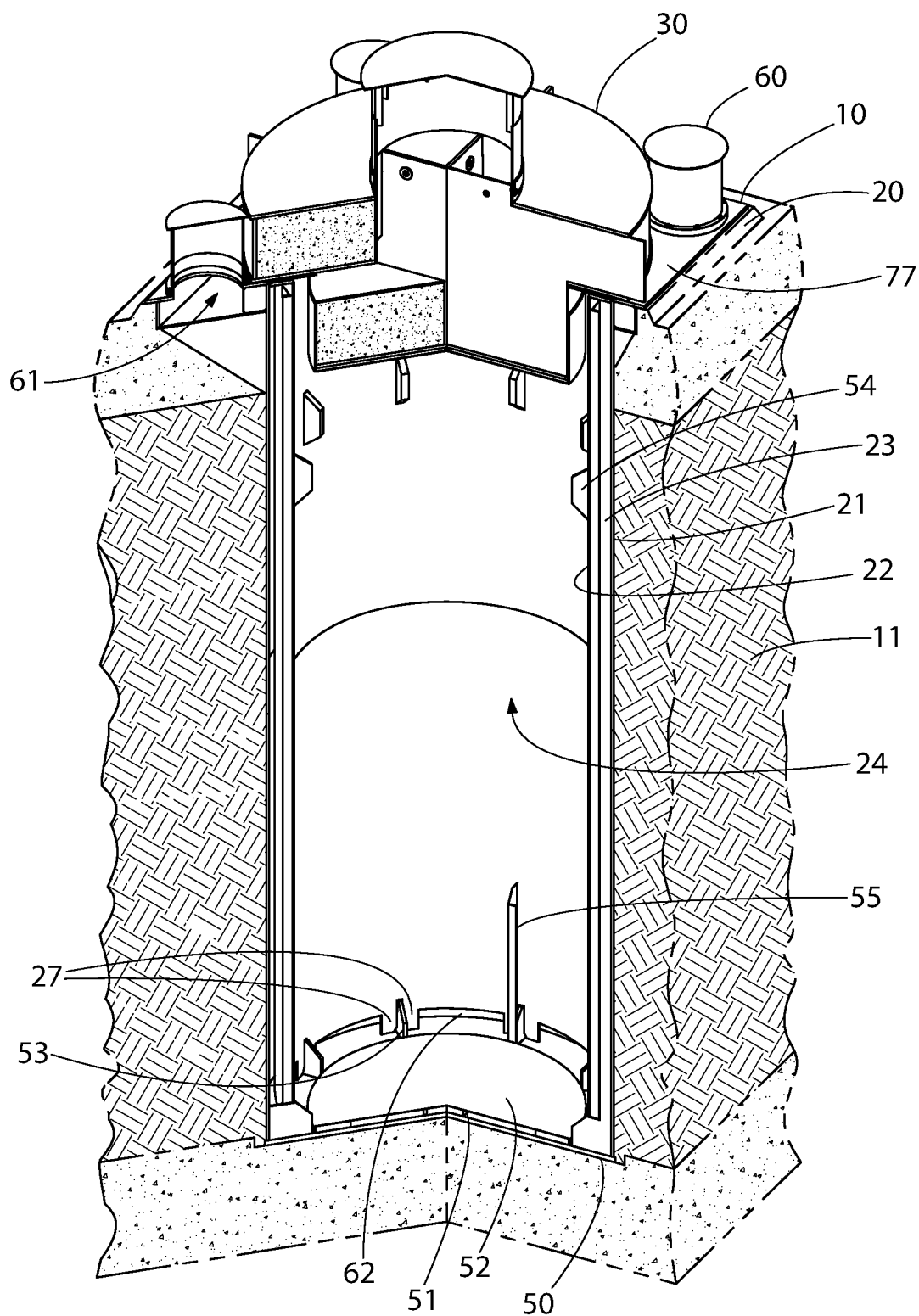
FIG. 2 is a sectional view of the HLW storage container of FIG. 1 along the line II-II.

FIG. 1 illustrates a high level waste ("HLW") storage container 10, encased in surrounding concrete 11, as it would be in an installation. FIG. 2 illustrates the storage container 10 in a sectional view, still with the surrounding concrete 101. While the HLW storage container 10 will be described in terms of being used to store a canister of spent nuclear fuel, it will be appreciated by those skilled in the art that the systems and methods described herein can be used to store any and all kinds of HLW.

The HLW storage container 10 is designed to be a vertical, ventilated dry system for storing HLW such as spent fuel. The HLW storage container 10 is fully compatible with 100 ton and 125 ton transfer casks for HLW transfer procedures, such as spent fuel canister transfer operations. All spent fuel canister types engineered for storage in free-standing, below grade, and/or anchored overpack models can be stored in the HLW storage container 10.

As used herein the term "canister" broadly includes any spent fuel containment apparatus, including, without limitation, multi-purpose canisters and thermally conductive casks. For example, in some areas of the world, spent fuel is transferred and stored in metal casks having a honeycomb grid-work/basket built directly into the metal cask. Such casks and similar containment apparatus qualify as canisters, as that term is used herein, and can be used in conjunction with the HLW storage container 10 as discussed below.

The HLW storage container 10 can be modified/designed to be compatible with any size or style of transfer cask. The HLW storage container 10 can also be designed to accept spent fuel canisters for storage at an Independent Spent Fuel Storage Installations ("ISFSI"). ISFSIs employing the HLW storage container 10 can be designed to accommodate any number of the HLW storage container 10 and can be expanded to add additional HLW storage containers 100 as the need arises. In ISFSIs utilizing a plurality of the HLW storage container 10, each HLW storage container 10 functions completely independent form any other HLW storage container 10 at the ISFSI.

The HLW storage container 10 has a body 20 and a lid 30. The lid 30 rests atop and is removable/detachable from the body 20. Although an HLW storage container can be adapted for use as an above grade storage system, by incorporating design features found in U.S. Pat. No. 7,933,374, this HLW storage container 10, as shown, is designed for use as a below grade storage system.

Referring to FIG. 2, the body 20 includes an outer shell 21 and an inner shell 22. The outer shell 21 surrounds the inner shell 22, forming a space 23 therebetween. The outer shell 21 and the inner shell 22 are generally cylindrical in shape and concentric with one another. As a result, the space 23 is an annular space. While the shape of the inner and outer shells 22, 21 is cylindrical in the illustrated embodiment, the shells can take on any shape, including without limitation rectangular, conical, hexagonal, or irregularly shaped. In some embodiments, the inner and outer shells 22, 22 will not be concentrically oriented.

The space 23 formed between the inner shell 22 and the outer shell 21 acts as a passageway for cool air. The exact width of the space 23 for any HLW storage container 10 is determined on a case-by-case design basis, considering such factors as the heat load of the HLW to be stored, the temperature of the cool ambient air, and the desired fluid flow dynamics. In some embodiments, the width of the space 23 will be in the range of 1 to 6 inches. While the width of space 23 can vary circumferentially, it may be desirable to design the HLW storage container 10 so that the width of the space 23 is generally constant in order to effectuate symmetric cooling of the HLW container and even fluid flow of the incoming air. As discussed in greater detail below, the space 23 may be divided up into a plurality of passageways.

The inner shell 22 and the outer shell 21 are secured atop a floor plate 50. The floor plate 50 is hermetically sealed to the outer shell 21, and it may take on any desired shape. A plurality of spacers 51 are secured atop the floor plate 50 within the space 23. The spacers 51 support a pedestal 52, which in turn supports a canister. When a canister holding HLW is loaded into the cavity 24 for storage, the bottom surface of the canister rests atop the pedestal 52, forming an inlet air plenum between the underside of the pedestal 52 and the floor of cavity 24. This inlet air plenum contributes to the fluid flow and proper cooling of the canister.

Preferably, the outer shell 21 is seal joined to the floor plate 50 at all points of contact, thereby hermetically sealing the HLW storage container 10 to the ingress of fluids through these junctures. In the case of weldable metals, this seal joining may comprise welding or the use of gaskets. Most preferably, the outer shell 21 is integrally welded to the floor plate 50.

An upper flange 77 is provided around the top of the outer shell 21 to stiffen the outer shell 21 so that it does not buckle or substantially deform under loading conditions. The upper flange 77 can be integrally welded to the top of the outer shell 21.

The inner shell 22 is laterally and rotationally restrained in the horizontal plane at its bottom by support legs 27 which straddle lower ribs 53. The lower ribs 53 are preferably equispaced about the bottom of the cavity 24. The inner shell 22 is preferably not welded or otherwise permanently secured to the bottom plate 50 or outer shell 21 so as to permit convenient removal for decommissioning, and if required, for maintenance.

The inner shell 22, the outer shell 21, the floor plate 50, and the upper flange 77 are preferably constructed of a metal, such as a thick low carbon steel, but can be made of other materials, such as stainless steel, aluminum, aluminum-alloys, plastics, and the like. Suitable low carbon steels include, without limitation, ASTM A516, Gr. 70, A515 Gr. 70 or equal. The desired thickness of the inner and outer shells 22, 21 is matter of design choice and will determined on a case-by-case basis.

Figure 4A:
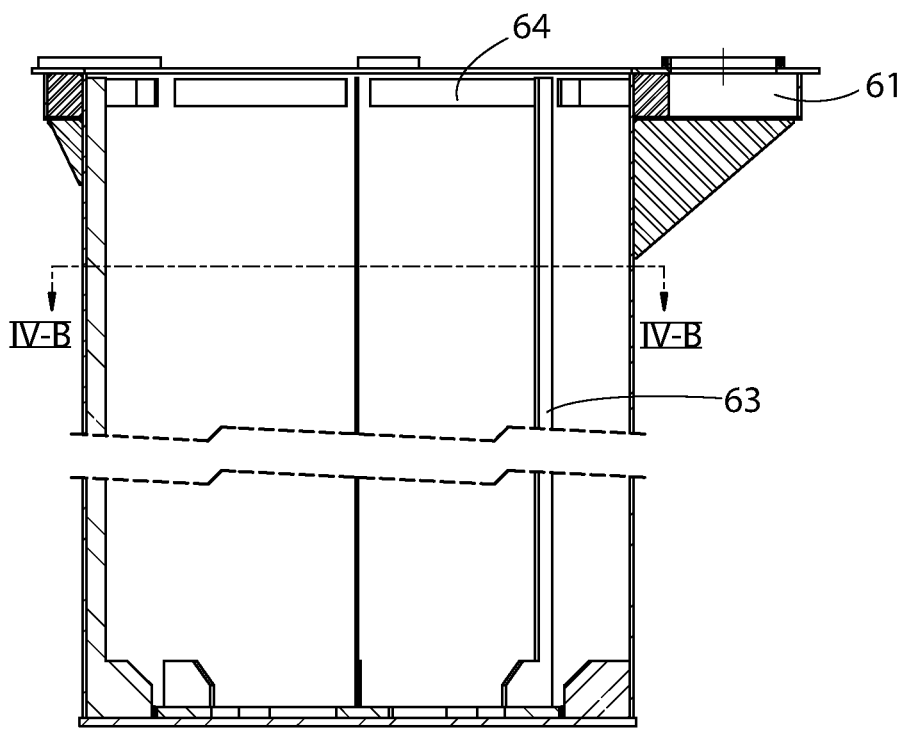
FIG. 4A is a partial sectional view of the HLW storage container of FIG. 1.

The inner shell 22 forms a cavity 24. The size and shape of the cavity 24 is also a matter of design choice. However, it is preferred that the inner shell 22 be designed so that the cavity 24 is sized and shaped so that it can accommodate a canister of spent nuclear fuel or other HLW. While not necessary, it is preferred that the horizontal cross-sectional size and shape of the cavity 24 be designed to generally correspond to the horizontal cross-sectional size and shape of the canister-type that is to be used in conjunction with a particular HLW storage container. More specifically, it is desirable that the size and shape of the cavity 24 be designed so that when a canister containing HLW is positioned in the cavity 24 for storage (as illustrated in FIG. 4A), a small clearance exists between the outer side walls of the canister and the side walls of the cavity 24.

Designing the cavity 24 so that a small clearance is formed between the side walls of the stored canister and the side walls of the cavity 24 limits the degree the canister can move within the cavity during a catastrophic event, thereby minimizing damage to the canister and the cavity walls and prohibiting the canister from tipping over within the cavity. This small clearance also facilitates flow of the heated air during HLW cooling. The exact size of the clearance can be controlled/designed to achieve the desired fluid flow dynamics and heat transfer capabilities for any given situation. In some embodiments, for example, the clearance may be 1 to 3 inches. A small clearance also reduces radiation streaming.

The inner shell 22 is also equipped with multiple sets of equispaced longitudinal ribs 54, 55, in addition to the lower ribs 53 discussed above. One set of ribs 54 are preferably disposed at an elevation that is near the top of a canister of HLW placed in the cavity 24. This set of ribs 54 may be shorter in length in comparison to the height of the cavity 24 and a canister. Another set of ribs 55 are set below the first set of ribs 54. This second set of ribs 55 is more elongated than the first set of ribs 54, and these ribs 55 extend to, or nearly to, the bottom of the cavity 24. These ribs 53, 54, 55 serve as guides for a canister of HLW is it is lowered down into the cavity 24, helping to assure that the canister properly rests atop the pedestal 52. The ribs also serve to limit the canister's lateral movement during an earthquake or other catastrophic event to a fraction of an inch.

A plurality of openings 25 are provided in the inner shell 22 at or near its bottom between the support legs 27. Each opening 25 provides a passageway between the annular space 23 and the bottom of the cavity 24. The openings 25 provide passageways by which fluids, such as air, can pass from the annular space 23 into the cavity 24. The openings 25 are used to facilitate the inlet of cooler ambient air into the cavity 24 for cooling a stored HLW having a heat load. As illustrated, eight openings 25 are equispaced about the bottom of the inner shell 22. However, any number of openings 25 can be included, and they may have any spacing desired. The exact number and spacing will be determined on a case-by-case basis and will dictated by such considerations as the heat load of the HLW, desired fluid flow dynamics, etc. Moreover, while the openings 25 are illustrated as being located in the side wall of the inner shell 22, the openings can be provided in the floor plate in certain modified embodiments of the HLW storage container.

The openings 25 in the inner shell 22 are sufficiently tall to ensure that if water enters the cavity 24, the bottom region of a canister resting on the pedestal 52 would be submerged for several inches before the water level reaches the top edge of the openings 25. This design feature helps ensure thermal performance of the system under accidental flooding of the cavity 24.

Figure 3:
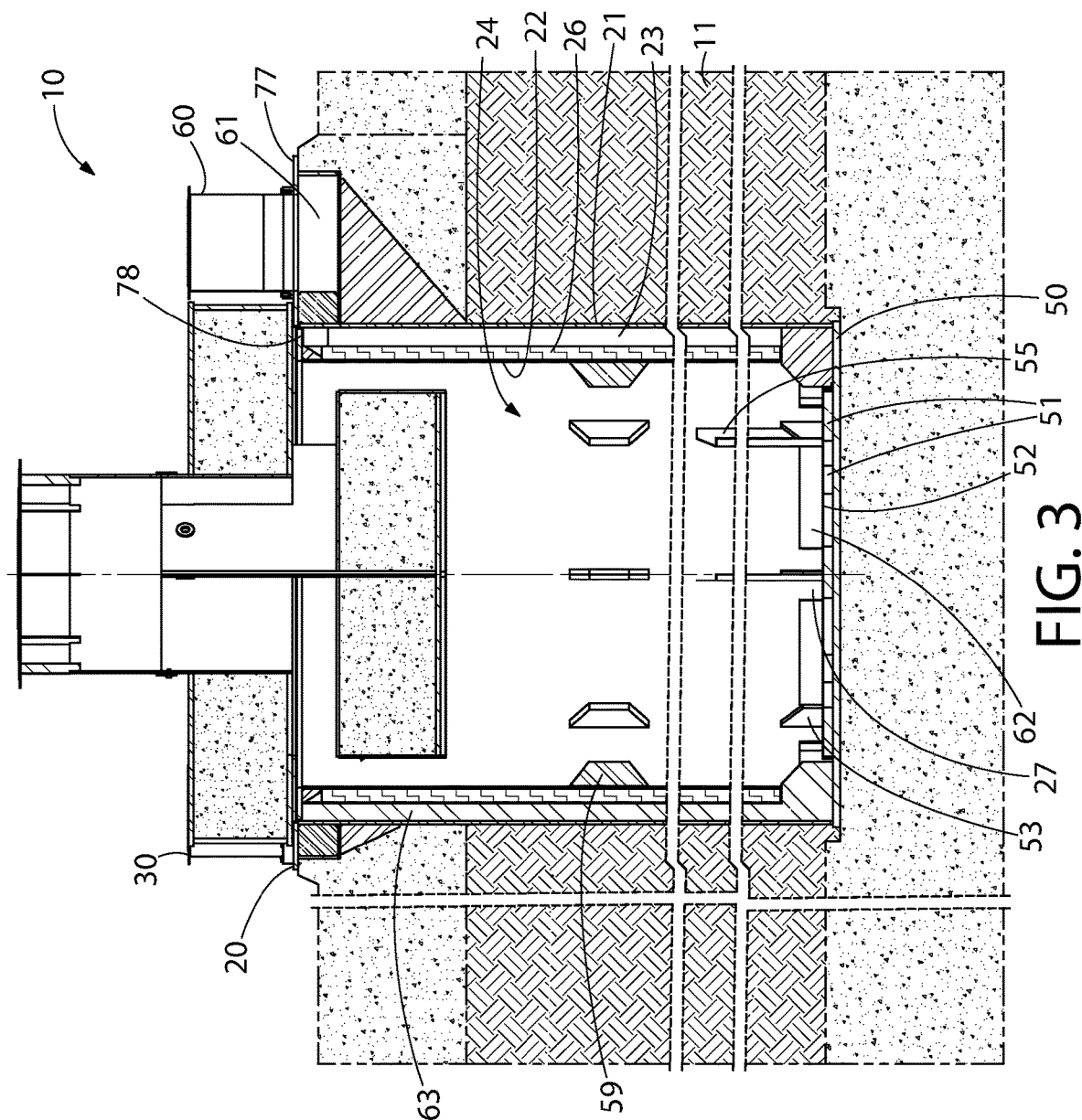
FIG. 3 is a partial sectional view of the HLW storage container of FIG. 1 along the line III-III.

With reference to FIG. 3, a layer of insulation 26 is provided around the outside surface of the inner shell 22 within the annular space 23. The insulation 26 is provided to minimize heating of the incoming cooling air in the space 23 before it enters the cavity 24. The insulation 26 helps ensure that the heated air rising around a canister situated in the cavity 24 causes minimal pre-heating of the downdraft cool air in the annular space 23. The insulation 26 is preferably chosen so that it is water and radiation resistant and undegradable by accidental wetting. Suitable forms of insulation include, without limitation, blankets of alumina-silica fire clay (Kaowool Blanket), oxides of alimuna and silica (Kaowool S Blanket), alumina-silica-zirconia fiber (Cerablanket), and alumina-silica-chromia (Cerachrome Blanket). The desired thickness of the layer of insulation 26 is matter of design and will be dictated by such considerations such as the heat load of the HLW, the thickness of the shells, and the type of insulation used. In some embodiments, the insulation will have a thickness in the range ½ to 6 inches.

Figure 4B:
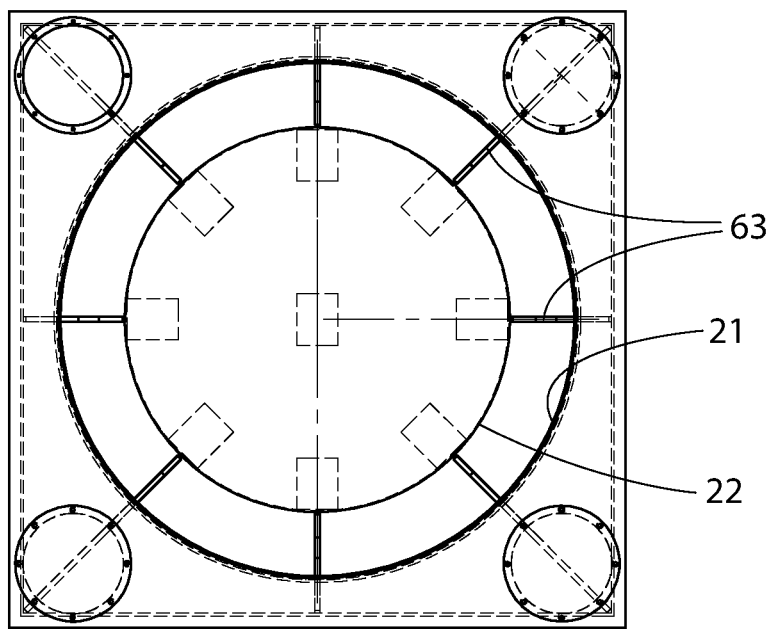
FIG. 4B is a sectional view of the HLW storage container FIG. 5A along the line IV-B-IV-B.

As shown in FIGS. 2 and 3, inlet ducts 60 are disposed on the top surface of the upper flange 77. Each inlet duct 60 connects to two inlet passageways 61 which continue from under the upper flange 77, into the space 23 between the outer and inner shells 21, 22, and then connect to the cavity 24 by lower openings 62 in the bottom of the inner shell 22. Within the space 23, the inlet passageways 61 are separated by dividers 63 to keep cooling air flowing through each inlet passageway 61 separate from the other inlet passageways 61 until the cooling air emerges into the cavity 24. FIGS. 4A and 4B illustrate the configuration of the inlet passageways 61 and the dividers 63. Each inlet passageway 61 connects with the space 23 by openings 64 in the top of the outer shell 21. From the openings 64, the cooling air continues down the in the space, via the individual inlet passageways 61 created by the dividers 64, and into the cavity 24, where it is used to cool a placed HLW canister. The dividers 63 are equispaced within the space 23 to aid in balancing the air pressure entering the space 23 from each inlet duct and inlet passageway. Also, as shown in the figures, each of the lower ribs 53 is integrated with one of the dividers 63, such that the lower ribs form an extension of the dividers, extending into the cavity 24.

Referring back to FIG. 3, each inlet duct 60 includes a duct cover 65, to help prevent rain water or other debris from entering and/or blocking the inlet passageways 61, affixed on top of an inlet wall 66 that surrounds the inlet passageways 61 on the top surface of the upper flange 77. The inlet wall 66 is peripherally perforated around the entire periphery of the opening of the inlet passageways 61. At least a portion of the lower part of the inlet ducts are left without perforations, to aid in preventing rain water from entering the HLW storage container. Preferably, the inlet wall 66 is perforated over 60% or more of its surface, and the perforations can be made in any shape, size, and distribution in accordance with design preferences. When the inlet ducts 60 are formed with the inlet wall 66 peripherally perforated, each of the inlet ducts has been found to maintain an intake air pressure independently of each of the other inlet ducts, even in high wind conditions, and each of the inlet ducts has been found to maintain an intake air pressure substantially the same as each of the other inlet ducts, again, even in high wind conditions.

The lid 30 rests atop and is supported by the upper flange 77 and a shell flange 78, the latter being disposed on and connected to the tops edge of the inner shell 22. The lid 30 encloses the top of the cavity 24 and provides the necessary radiation shielding so that radiation does not escape from the top of the cavity 24 when a canister loaded with HLW is stored therein. The lid 30 is designed to facilitate the release of heated air from the cavity 24.

Figure 5A:
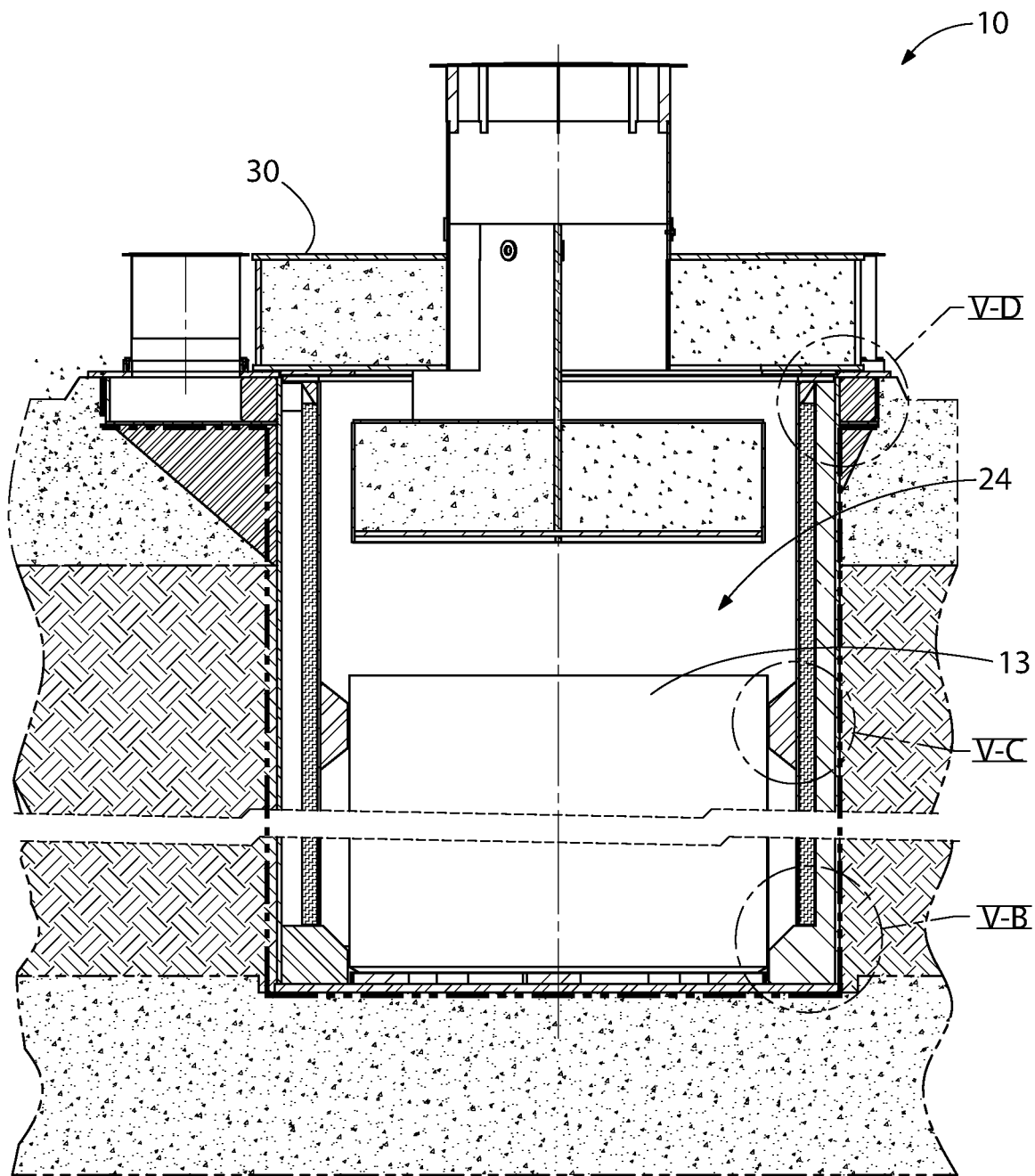
FIG. 5A is a partial sectional view of the HLW storage container of FIG. 1 having a canister positioned in the cavity.

FIG. 5A illustrates the HLW storage container 10 with a canister 13 placed within the cavity 24. As shown in the FIG. 5B detailed view, the bottom of the canister 13 sits on the pedestal 52, and the lower ribs 53 maintain a space between the bottom of the canister 13 and the inner shell 22. Similarly, the FIG. 5C detailed view shows that the upper ribs 54 maintain a space between the top of the canister 13 and the inner shell 22.

The FIG. 5D detailed view shows the lid 30 resting atop the upper flange 77 and the shell flange 78. The lid 30 includes a closure gasket 31 which forms a seal against the upper flange 77 when the lid 30 is seated, and a leaf spring gasket 32 which forms a seal against the shell flange 78.

Figure 6:
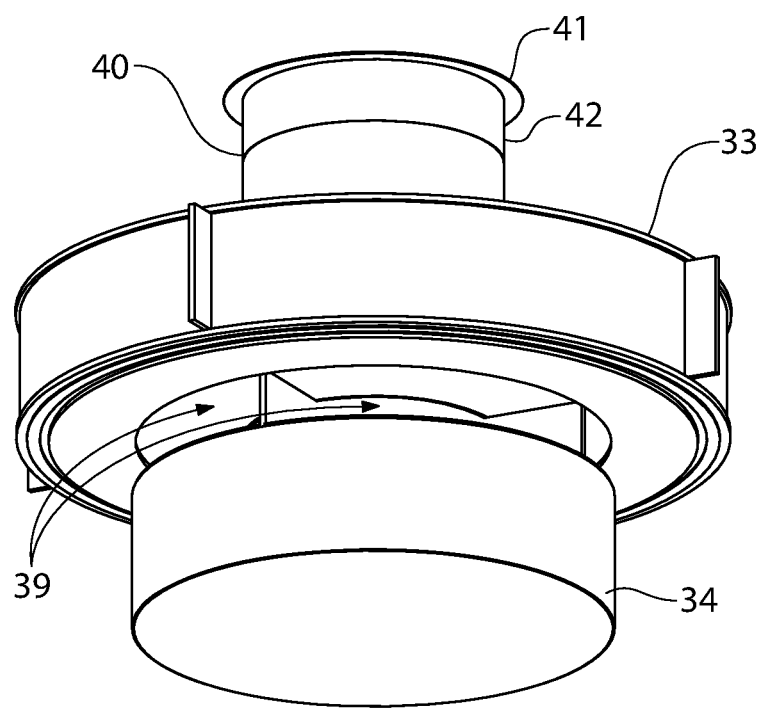
FIG. 6 is an isometric view of a lid for a HLW storage container.
Figure 7:
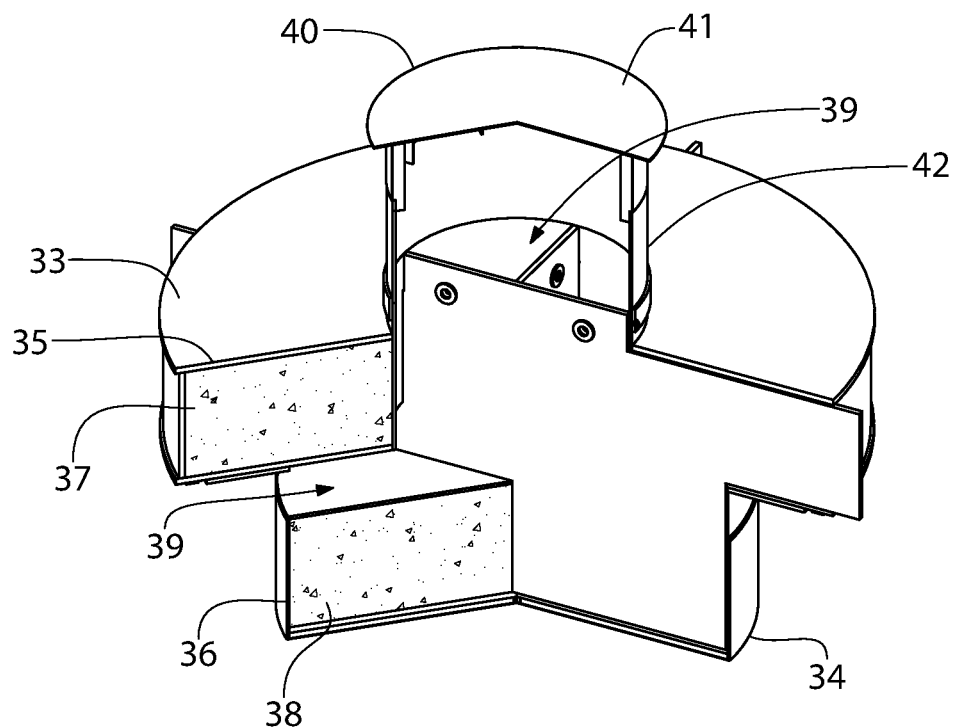
FIG. 7 is a sectional view of the lid of FIG. 6.

FIGS. 6 and 7 illustrate the lid 30 removed from the body of the HLW storage container. Referring first to FIG. 6, the lid 30 is preferably constructed of a combination of low carbon steel and concrete (or another radiation absorbing material) in order to provide the requisite radiation shielding. The lid 30 includes an upper lid part 33 and a lower lid part 34. The upper lid part 33 preferable extends at least as high as, if not higher than, the top of each inlet duct 60. Each lid part 33, 34 includes an external shell 35, 36 encasing an upper concrete shield 37 and a lower concrete shield 38. One or more outlet passageways 39 are formed within and around the body parts 33, 34 to connect the cavity with the outlet duct 40 formed on the top surface of the lid 30. The outlet passageways 39 pass over the lower lid part 34, between the upper and lower lid parts 33, 34, and up through a central aperture within the upper lid part 34. The outlet duct 40 covers this central aperture to better control the heated air as it rises up out of the. By being disposed on the top of the lid 30, the outlet duct 40 may also be raised up significantly higher than the inlet ducts, using any desired length of extension for the outlet duct. By raising up the outlet duct higher, mixing between the heated air emitted from the outlet duct and cooler air being drawn into the inlet ducts can be significantly reduced, if not eliminated altogether.

The outlet duct 40, which is constructed similar to the inlet ducts, includes a duct cover 41, to help prevent rain water or other debris from entering and/or blocking the outlet passageways 39, affixed on top of an outlet wall 42 that surrounds the outlet passageways 39 on the top surface of the upper lid part 33. The outlet wall 42 is peripherally perforated around the entire periphery of the opening of the outlet passageways 39. At least a portion of the lower part of the outlet duct is left without perforations, to aid in preventing rain water from entering the HLW storage container. Preferably, the outlet wall 42 is perforated over 60% or more of its surface, and the perforations can be made in any shape, size, and distribution in accordance with design preferences.

The external shell of the lid 30 may be constructed of a wide variety of materials, including without limitation metals, stainless steel, aluminum, aluminum-alloys, plastics, and the like. The lid may also be constructed of a single piece of material, such as concrete or steel for example, so that it has no separate external shell.

When the lid 30 is positioned atop the body 20, the outlet passageways 39 are in spatial cooperation with the cavity 24. As a result, cool ambient air can enter the HLW storage container 10 through the inlet ducts 60, flow into the space 23, and into the bottom of the cavity 24 via the openings 62. When a canister containing HLW having a heat load is supported within the cavity 24, this cool air is warmed by the HLW canister, rises within the cavity 24, and exits the cavity 24 via the outlet ducts 40.

Because the inlet ducts 60 are placed on different sides of the lid 30, and the dividers separate the inlet passageways associated with the different inlet ducts, the hydraulic resistance to the incoming air flow, a common limitation in ventilated modules, is minimized. This configuration makes the HLW storage container less apt to build up heat internally under high wind conditions.

Figure 8:
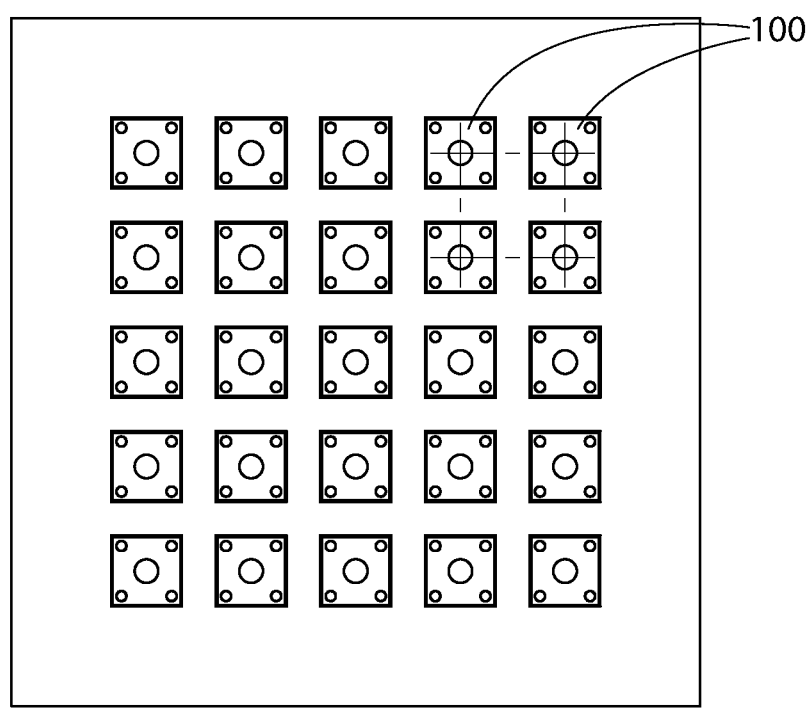
FIG. 8 is a plan view of an array of HLW storage containers.

A plurality of HLW storage containers 100 can be used at the same ISFSI site and situated in arrays as shown in FIG. 8. Although the HLW storage containers 100 are closely spaced, the design permits a canister in each HLW storage container 10 to be independently accessed and retrieved easily. In addition, the design of the individual storage containers 100, and particularly the design and positioning of the inlet and outlet ducts, enables the inlet ducts of a first of the storage containers to maintain air pressure independently of the inlet ducts of a second of the storage containers. Each storage container therefore will operate independently of each of the other storage containers, such that the failure of one storage container is unlikely to lead directly to the failure of other surrounding storage containers in the array.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A below grade storage system for radioactive waste, the system comprising:
   a storage container having a height of which a majority extends below grade, the container comprising:
      an outer shell comprising a hermetically sealed bottom floor plate;
      an inner shell disposed inside the outer shell and defining a cavity configured for holding a nuclear waste storage canister,
      an annular space formed between the inner shell and the outer shell, the annular space in fluid communication with a bottom portion of the cavity;
      at least one air inlet duct configured to draw ambient cooling air from above grade downwards into the annular space; and
      an air outlet duct in fluid communication with the cavity of the inner shell and ambient environment;
   wherein a cooling airflow pathway is formed from the at least one air inlet duct through the annular space and the cavity to the air outlet duct;
   wherein the at least one air inlet duct is located above grade and is fluidly coupled to a top portion of the annular space by an air inlet passageway;
   wherein the air inlet duct is spaced radially outwards apart from the outer shell, the air inlet passageway configured to draw ambient cooling air downwards through the air inlet duct and radially inwards to the top portion of the annular space through the air inlet passageway.

2. The system according to claim 1, wherein the at least one air inlet duct is a cylindrical structure which is located at a higher elevation than a top end of the outer shell.

3. The system according to claim 2, wherein the at least one air inlet duct comprises a plurality of air inlet ducts spaced perimetrically around and radially outwards apart from the outer shell, each air inlet duct defining an air inlet passageway fluidly coupled to the top portion of the annular space.

4. The system according to claim 2, wherein the air outlet duct comprises a perforated cylindrical outlet wall configured to expel cooling air radially outwards to atmosphere from the cavity.

5. The system according to claim 4, wherein the air outlet duct is located at higher elevation than the at least one air inlet duct.

6. The system according to claim 1, wherein the air outlet duct is attached to a lid removably mounted to a top end of the storage container.

7. A below grade storage system for radioactive waste, the system comprising:
   a storage container having a height of which a majority extends below grade, the container comprising:
      an outer shell comprising a hermetically sealed bottom floor plate;
      an inner shell disposed inside the outer shell and defining a cavity configured for holding a nuclear waste storage canister,
      an annular space formed between the inner shell and the outer shell, the annular space in fluid communication with a bottom portion of the cavity;
      at least one air inlet duct configured to draw ambient cooling air from above grade downwards into the annular space; and
      an air outlet duct in fluid communication with the cavity of the inner shell and ambient environment;
   wherein a cooling airflow pathway is formed from the at least one air inlet duct through the annular space and the cavity to the air outlet duct;
   wherein the at least one air inlet duct is located above grade and is fluidly coupled to a top portion of the annular space by an air inlet passageway;
   wherein the at least one air inlet duct is a structure which is located at a higher elevation than a top end of the outer shell;
   wherein the air inlet duct comprises a perforated cylindrical inlet wall configured to draw ambient cooling air radially inwards into the inlet duct.

8. The system according to claim 7, wherein the structure is cylindrical.

9. A below grade storage system for radioactive waste, the system comprising:
- a storage container having a height of which a majority extends below grade, the container comprising:
  - an outer shell comprising a hermetically sealed bottom floor plate;
  - an inner shell disposed inside the outer shell and defining a cavity configured for holding a nuclear waste storage canister,
  - an annular space formed between the inner shell and the outer shell, the annular space in fluid communication with a bottom portion of the cavity;
  - at least one air inlet duct configured to draw ambient cooling air from above grade downwards into the annular space; and
  - an air outlet duct in fluid communication with the cavity of the inner shell and ambient environment;
  - wherein a cooling airflow pathway is formed from the at least one air inlet duct through the annular space and the cavity to the air outlet duct;
- wherein the at least one air inlet duct is located above grade and is fluidly coupled to a top portion of the annular space by an air inlet passageway;
- wherein the at least one air inlet duct is a structure which is located at a higher elevation than a top end of the outer shell;
- wherein the at least one air inlet duct comprises a plurality of air inlet ducts spaced perimetrically around and radially outwards apart from the outer shell, each air inlet duct defining an air inlet passageway fluidly coupled to the top portion of the annular space;
- wherein the outer shell further comprises a peripheral flange located above grade and extending outwards from the outer shell, the air inlet ducts each being supported by the peripheral flange and in fluid communication with the top portion of the annular airflow space through the peripheral flange.

10. The system according to claim 9, wherein a top end of the outer shell comprises a plurality of upper flow openings which fluidly connect each air inlet duct with the annular space.

11. The system according to claim 10, further comprising a plurality of dividers extending from a top of the inner shell to a bottom of the inner shell, the dividers dividing the annular space into a plurality of fluidly isolated vertical passageways.

12. The system according to claim 11, wherein each vertical passageway is fluidly coupled to one of the top flow openings at top and fluidly coupled to a bottom portion of the cavity of the inner shell by a lower flow opening in a bottom of the inner shell.

13. The system according to claim 12, wherein each air inlet duct is fluidly coupled to a pair of the vertical passageways.

14. The system according to claim 12, wherein the lower flow openings are circumferentially spaced apart defining a castellated bottom end of the inner shell.

15. The system according to claim 14, wherein the castellated bottom end defines a plurality of circumferentially spaced apart and downwardly extending support legs formed between the lower flower openings.

16. The system according to claim 15, wherein each support leg straddles and engages a lower ribs extending radially inwards to the inner shell.

17. The system according to claim 9, wherein the peripheral flange rests on a concrete encasement perimetrically surrounding at least an upper portion of the outer shell.

18. The system according to claim 17, wherein the peripheral flange has a rectilinear shape.

19. The system according to claim 17, wherein the at least one air inlet duct is fluidly coupled to the annular space by an air inlet passageway which extends through the concrete encasement.

20. The system according to claim 9, wherein the structure is cylindrical.

* * * * *